(12) United States Patent
Rusu et al.

(10) Patent No.: US 9,087,146 B2
(45) Date of Patent: Jul. 21, 2015

(54) WEAR-OUT EQUALIZATION TECHNIQUES FOR MULTIPLE FUNCTIONAL UNITS

(71) Applicants: Stefan Rusu, Santa Clara, CA (US); Zhiguo Wang, Palo Alto, CA (US); Krishnakanth V. Sistla, Beaverton, OR (US)

(72) Inventors: Stefan Rusu, Santa Clara, CA (US); Zhiguo Wang, Palo Alto, CA (US); Krishnakanth V. Sistla, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 283 days.

(21) Appl. No.: 13/723,304

(22) Filed: Dec. 21, 2012

(65) Prior Publication Data
US 2014/0181596 A1    Jun. 26, 2014

(51) Int. Cl.
G06F 11/00    (2006.01)
G06F 11/34    (2006.01)

(52) U.S. Cl.
CPC .................................. *G06F 11/3409* (2013.01)

(58) Field of Classification Search
CPC ............ G06F 11/3409; G06F 11/3495; G06F 11/3058
USPC ....................................................... 714/47.3
See application file for complete search history.

(56) References Cited

U.S. PATENT DOCUMENTS

| | | | |
|---|---|---|---|
| 7,475,320 B2 * | 1/2009 | Knebel et al. ................. | 714/746 |
| 8,258,770 B2 * | 9/2012 | Wu et al. ....................... | 323/285 |
| 8,549,363 B2 * | 10/2013 | Cher et al. .................... | 714/47.3 |
| 8,578,143 B2 * | 11/2013 | Frank et al. ....................... | 713/1 |
| 2008/0126748 A1 * | 5/2008 | Capps et al. ..................... | 712/30 |
| 2009/0287909 A1 * | 11/2009 | Vera et al. ...................... | 712/220 |
| 2009/0288092 A1 * | 11/2009 | Yamaoka ....................... | 718/104 |
| 2009/0327656 A1 * | 12/2009 | Baum et al. ..................... | 712/43 |
| 2011/0265090 A1 * | 10/2011 | Moyer et al. .................. | 718/103 |
| 2012/0324248 A1 * | 12/2012 | Schluessler et al. .......... | 713/300 |
| 2013/0047166 A1 * | 2/2013 | Penzes et al. ................. | 718/105 |

OTHER PUBLICATIONS

Keane et al., "An Array-Based Odometer System for Statistically Significant Circuit Aging Characterization", "IEEE Journal of Solid-State Circuits", Oct. 21, 2011, vol. 46, No. 10, pp. 2374-2385.
Keane et al., "An Odometer for CPUS", "IEEE Spectrum", May 2011, pp. 28-33.
Kim et al., "Silicon Odometer: An On-Chip Reliability Monilrtor for Measuring Frequency Degradation of Digiltal Circuits", "Symposium on VLSI Circuits Digest of Technical Papers", 2007, vol. 12, pp. 1-2.

* cited by examiner

*Primary Examiner* — Philip Guyton
(74) *Attorney, Agent, or Firm* — Lowenstein Sandler LLP

(57) ABSTRACT

Wear-out equalization techniques for multiple functional hardware units are disclosed. An integrated circuit includes a power control unit (PCU) configured to monitor indicators of wear-out incurred by multiple functional hardware units of the integrated circuit. The PCU calculates cumulative wear-out metrics of the functional hardware units based on the monitored indicators and performs an equalization action to equalize the cumulative wear-out metrics of the functional hardware units.

26 Claims, 11 Drawing Sheets

WEAR-OUT EQUALIZATION TECHNIQUES FOR MULTIPLE FUNCTIONAL UNITS

TECHNICAL FIELD

The embodiments of the disclosure relate generally to processing devices and, more specifically, relate to wear-out equalization techniques for integrated circuits having multiple functional units.

BACKGROUND

Modern processors include multiple instances of processor cores that can be turned on or off independently as directed by a Power Control Unit (PCU). A multi-core processor, for example, is a single computing component with two or more independent actual central processing units (also referred to as "cores" or "processor cores"), which are the units that read and execute program instructions. The instructions are typically CPU instructions, but multiple cores can run multiple instructions at the same time, increasing overall speed for programs amenable to parallel computing. Manufacturers typically integrate the cores onto a single integrated circuit die, or onto multiple dies in a single package. A dual-core processor has two cores, a quad-core processor has four cores, and so on. Homogenous multi-core systems include only identical cores, and heterogeneous multi-core systems have cores that are not identical.

At any given time, only a portion of these processor cores can be powered up, with all the disabled ones being power-gated to suppress the leakage power. All active cores wear out in normal use and this wear-out of the active cores can be modeled as a function of the use conditions (operating voltage and temperature) and stress time. Typically manufacturers assume equal utilization of processor cores for their quality and reliability assessment. Present techniques generally cannot enforce equal wear-out for each processor core. For example, popular operating systems usually do not guarantee random core assignment. Without such enforcement, a given processor core can be repetitively assigned to operate at a "turbo" mode, while other cores are turned-off. The turbo mode is a highest performance state of the processor that enables a processor to run above its base operating frequency via dynamic control of the CPU's clock rate. The turbo mode can also be referred to as dynamic overclocking. When in the turbo state, the active cores wear-out much faster than the others and can eventually cause its catastrophic failure. A customer can rightfully disable all but two cores in Basic Input/Output System (BIOS) to ensure they always run in turbo mode, therefore assuming an increased risk of catastrophic failure. A malicious user can write a virus program that can run a specific core in turbo all the time, purposefully causing the system to fail.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure provide for wear-out equalization techniques for multiple functional hardware units (hereinafter referred to as functional units). In one embodiment, a power control unit (PCU) is configured to monitor indicators of wear-out incurred by multiple functional hardware units of an integrated circuit. The PCU calculates cumulative wear-out metrics of the functional hardware units based on the monitored indicators and performs an equalization action to equalize the cumulative wear-out metrics of the functional hardware units.

In one embodiment, a system is provided that includes a memory and a processing device communicably coupled to the memory. In one embodiment, the processing device includes the PCU to monitor the wear-out indicators, calculate the cumulative wear-out metrics, and perform the equalization action(s), as described herein.

Figure 1:
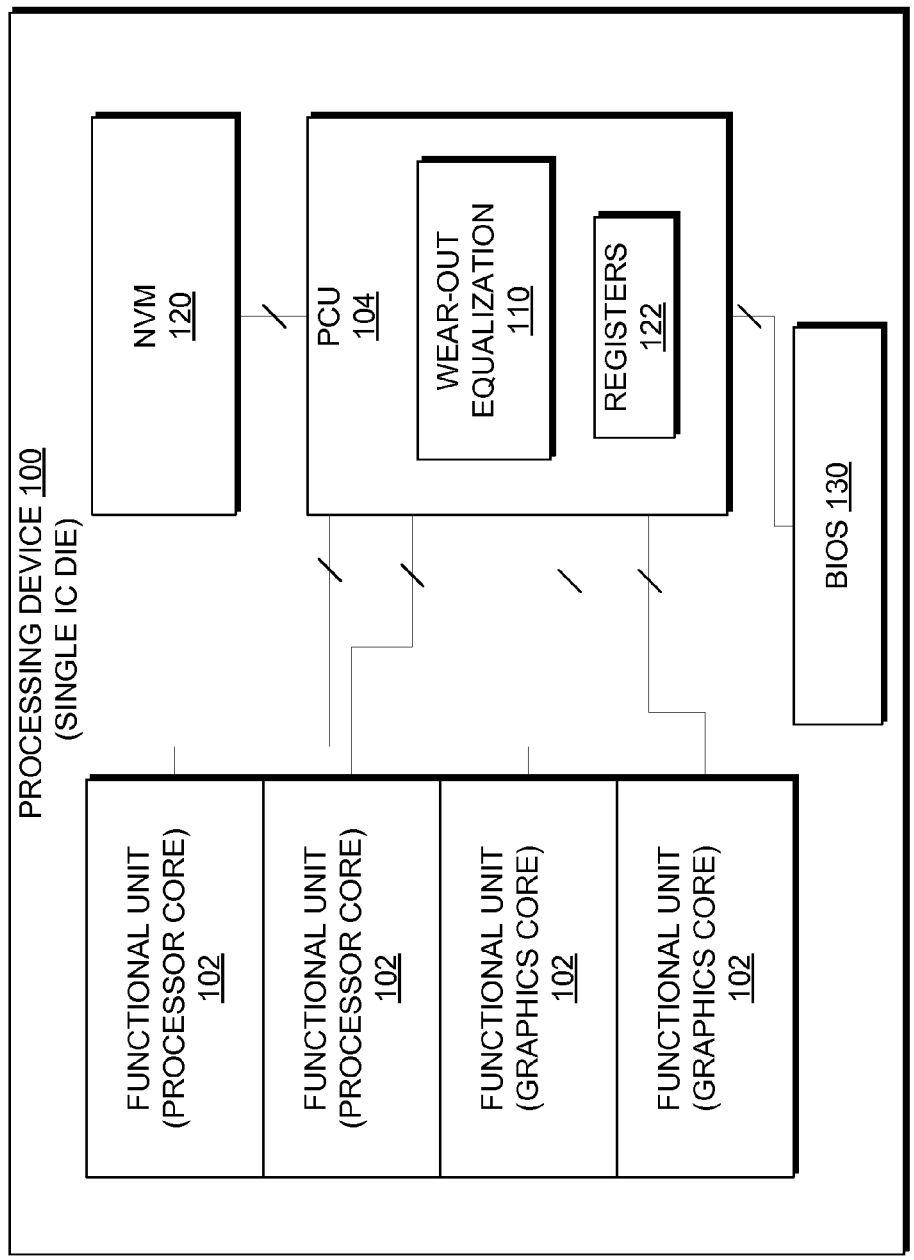
FIG. 1 is a block diagram of one embodiment of a processing device that implements a wear-out equalization unit for multiple functional hardware units.

FIG. 1 is a block diagram of one embodiment of a processing device 100 that implements a wear-out equalization unit 110 for multiple functional hardware units 102. In one embodiment, the processing device 100 is integrated in a single integrated circuit die having multiple hardware functional units 102 (hereafter referred to as a multi-core system). The multi-core system may be a multi-core processor package, but may include other types of functional units than just processor cores. Functional hardware units 102 may be processor cores, graphics cores (also referred to as graphics units), voltage regulator (VR) phases, input/output (I/O) interfaces (e.g., serial links, DDR memory channels) and their controllers, network controllers, fabric controllers, or any combination thereof. Functional units 102 may or may not share caches, and they may implement message passing or shared memory inter-core communication methods. Homogeneous multi-core systems are systems with identical cores. Sometimes identical cores are also referred to as equivalent cores. Heterogeneous multi-core systems have cores that are not identical or disparate functional units. Just as with single-processor systems, cores in multi-core systems may implement architectures such as superscalar, multi-threading, vector processing or the like. It should be noted that the embodiments described below are described in the context of an example multi-core system including multiple processor cores and multiple graphics cores for simplicity of description.

The processing device 100 is a multi-core system, which is a single computing component with multiple independent central processing units (CPUs), which are functional units 102 that read and execute program instructions. The multi-core systems implements multiprocessing in a single physical package. The processing device 100 also includes multiple graphics cores, which are configured to accelerate the building of images intended for output to a display.

The processing device 100 also includes a power control unit (PCU) 104 that implements the wear-out equalization unit 110, some embodiments of which are described in more detail below. The PCU 104 may include registers 122 and may interact with a non-volatile memory (NVM) device 120, which may be integrated into the same package as the PCU 104 or may be available on the same platform as the processing device 100, but not on the same package. The NVM device 120 is computer memory that can retain the stored information even when not powered. Examples of NVM include read-only memory, flash memory, hard disks, or the like. The processing device 100 may also include volatile memory, such as in the form of random access memory (RAM) or registers. In one embodiment, the wear-out equalization unit 110 utilizes registers 122 to store wear-out metrics as described herein. Alternatively, the wear-out equalization unit 110 may store the wear-out metrics in NVM 120, which may be on the same package as the PCU 104, or on a platform as described herein.

The PCU 104 governs power functions of the functional units 102. The PCU 104 may be an on-die microcontroller that has similar components to a computer, including firmware, software, memory, a CPU, I/O functions, timers, as well as analog-to-digital converters to receive measurements from sensors of the functional units 102. In one embodiment, the PCU 104 executes code, referred to as pcode, to implement the wear-out equalization unit 110. Alternatively, the wear-out equalization unit 110 can be implemented as hardware (e.g., circuitry, dedicated logic, programmable logic, microcode, etc.), firmware, software or any combination of the above. The PCU 104 may have its own embedded firmware and can measure inputs on temperature, current, power, as well as operating system (OS) requests. The PCU 104 can be used to independently clock the functional units 102. In one embodiment, the PCU 104 receives input from each of the functional units 102 and determines an operating voltage and an operating frequency for each of the functional units 102. The PCU 104 can also monitor OS performance state requests to be able to make decisions about what power/performance state to go into.

In one embodiment, the wear-out equalization unit 110 monitors indicators of wear-out incurred by the functional units 102 and calculates cumulative wear-out metrics of the functional units 102 based on the monitored indicators. The wear-out equalization unit 110 performs an equalization action to equalize the cumulative wear-out metrics of the functional units 102. Additional details of some embodiments of the wear-out equalization unit 110 are described below with respect to FIGS. 3-10.

In some embodiments, the wear-out equalization unit 110 communicates with BIOS 130 of the processing device 100 to identify the functional units 102, as well as to perform wear-out equalization actions to equalize wear-out of the functional units, as described in more detail below with respect to FIGS. 3-10.

Figure 2:
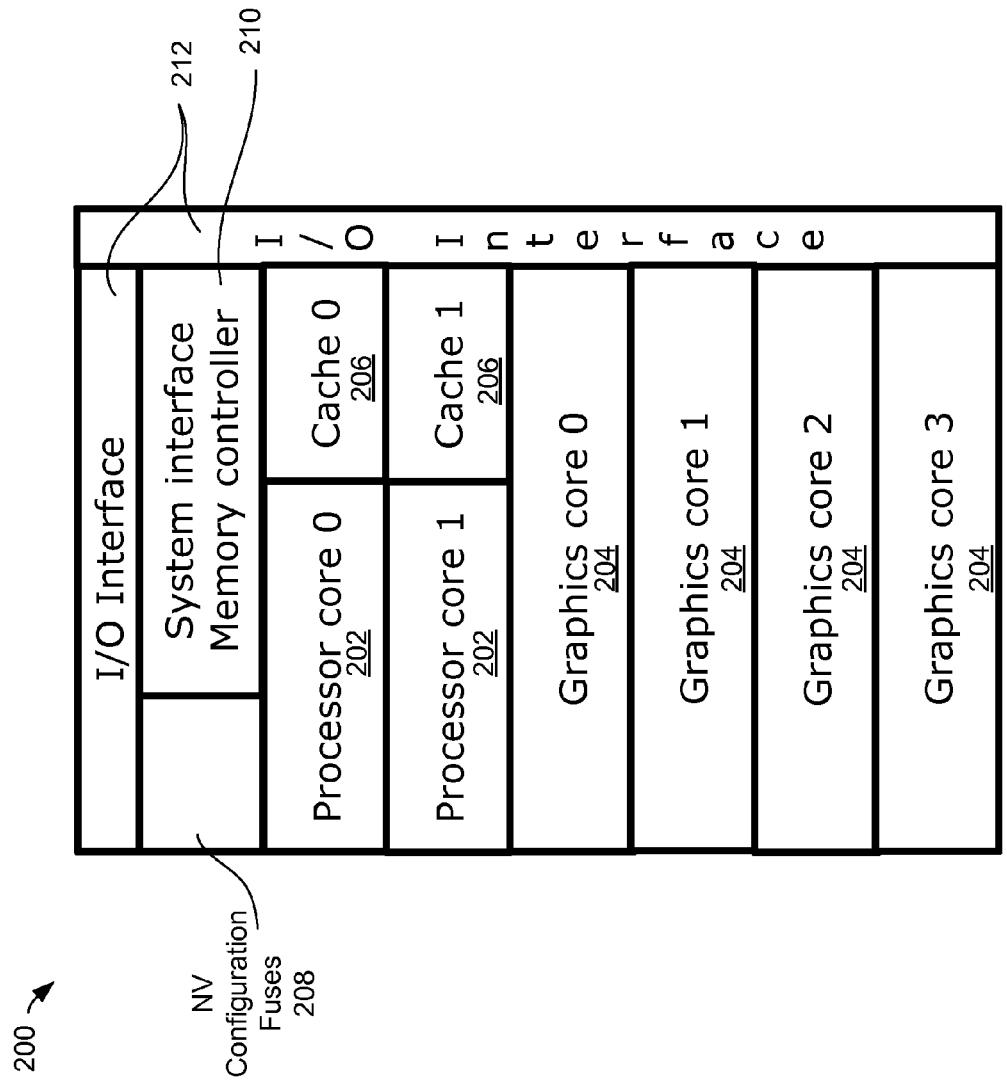
FIG. 2 is a block diagram illustrating one embodiment of a multi-core system including two processor cores and four graphics cores.

In another embodiment, the PCU 104 is integrated on a second integrated circuit die that is separate from the integrated circuit die on which the functional units 102 reside, such as illustrated in FIG. 2. Also, as noted above, the NVM 120 may also reside on a separate integrated circuit die from the functional units 102 or the PCU 104.

The components of FIG. 1 can reside on "a common carrier substrate," such as, for example, an integrated circuit ("IC") die substrate, a multi-chip module substrate or the like. Alternatively, the processing device 100 may reside on one or more printed circuit boards, such as, for example, a mother board, a daughter board or other type of circuit card. In other implementations, the main memory and the processing device 100 can reside on the same or different carrier substrates. In other implementations, the NVM 120 and the processing device 100 can reside on the same or different carrier substrates.

FIG. 2 is a block diagram illustrating one embodiment of a multi-core system 200 including two processor cores 202 and four graphics cores 206. The multi-core system 200 also includes two caches 206 corresponding to the two processor cores 202, non-volatile configuration fuse bits 208, system interface memory controller 210 and I/O interfaces 212. The PCU 104 (illustrated in FIG. 1) is configured to monitor and calculate the wear-out metrics for the processor cores 202 and the graphics cores 204 as described herein. The non-volatile configuration fuse bits 208 can refer to one-time programmable bits that can be burned with a set of programming values at the factory to customize the functionality of each chip. The PCU 104 may use the non-volatile configuration fuse bits 208 to store configuration values, look-up tables and constants used in calculations. The system interface memory controller 210 is used to send and receive data from memory (non-cache memory) outside the multi-core system 200. The I/O interfaces 212 can be the physical interfaces to other components external to the multi-core system 200. The PCU 104 is configured to calculate the wear-out metrics of the processor core 0 and processor core 1, the graphics core 0-3, and perform equalization techniques as described in more detail below.

Figure 3:
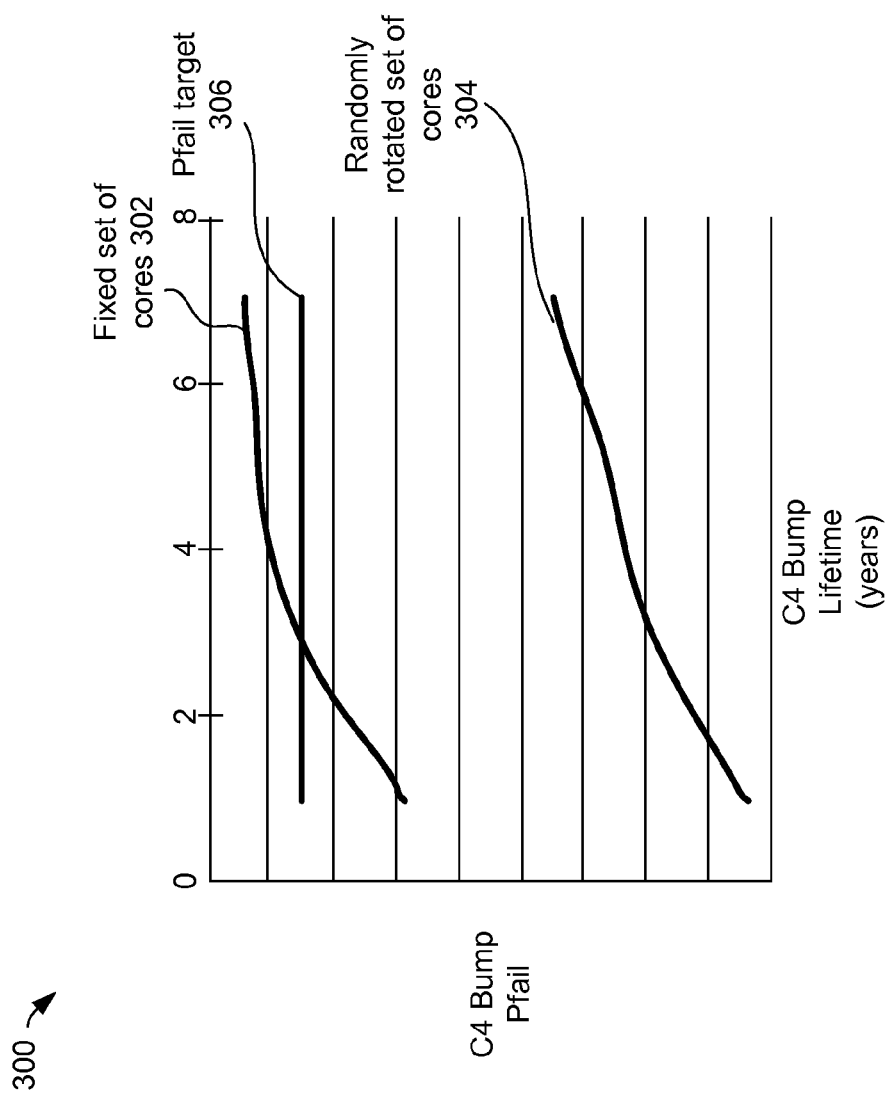
FIG. 3 is a graph illustrating C4 bump failure rates of fixed set of cores and an equalized set of cores over a C4 bump lifetime according to one embodiment.

FIG. 3 is a graph 300 illustrating C4 bump failure rates of a fixed set 302 of cores and an equalized set 304 of cores over a C4 bump lifetime according to one embodiment. C4, also referred to as controlled collapse chip connection or "flip chip", is a method for interconnecting semiconductor devices to external circuitry with solder bumps that have been deposited onto the chip pads. The C4 bump failure rate refers to the rate at which the C4 bumps fail over a period of time. A target failure (Pfail) 306 is a level at which the failures cause the cores to malfunction or be unusable. In particular, FIG. 3 shows the fail rate with a set of cores running top turbo frequency. If the same set of cores is running all the time, the accumulated wear-out of the set 302 reaches a target failure (Pfail) in about three years. As will be discussed in more detail below, embodiments of the present disclosure rotate the active set of cores among all available cores (304), which results in the accumulated wear-out of the equalized set 304 (e.g., randomly-rotated cores) being orders of magnitude before the Pfail target 306. It should be noted that the gap between these two cases widens as CPU core count increases, because the wear-out is spread over a larger number of active cores. The embodiments described herein provide a way to enforce utilization equalization of multiple functional cores.

Figure 4:
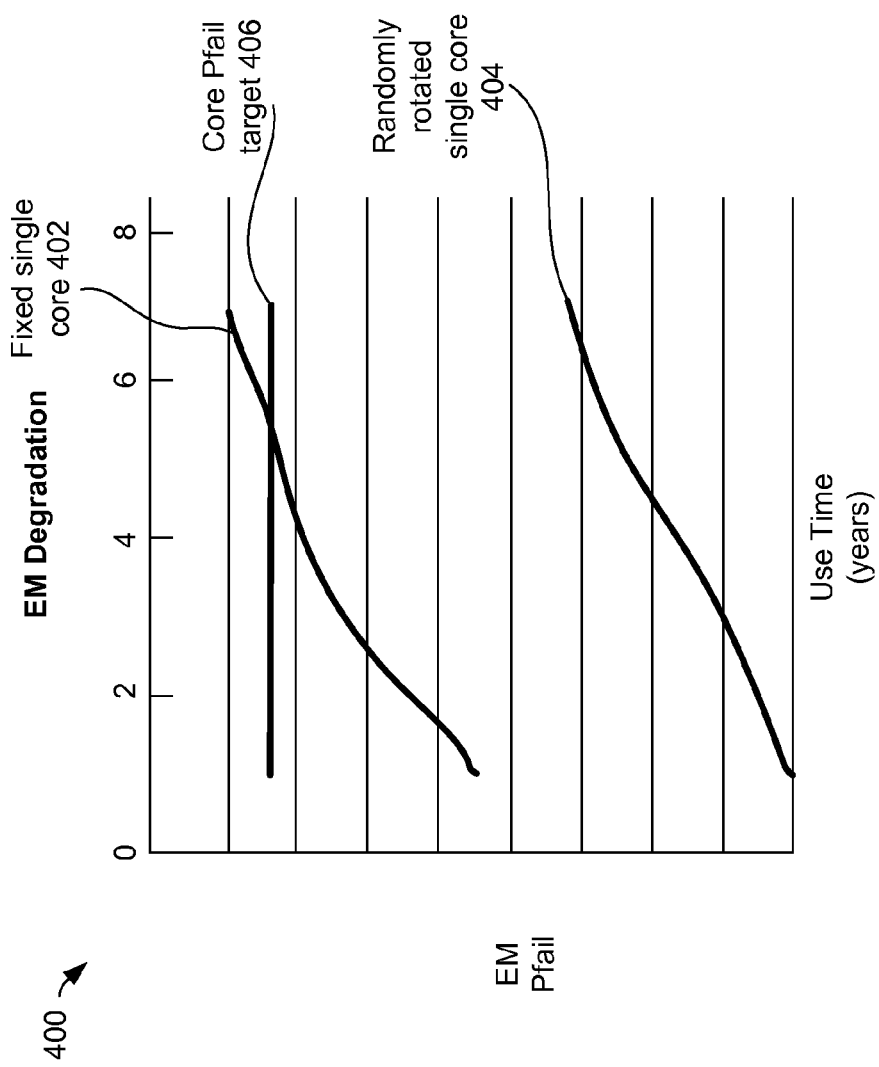
FIG. 4 is a graph illustrating electromigration (EM) over time for a fixed single core and a randomly rotated single core according to one embodiment.

Another potential failure mode is electromigration (EM). FIG. 4 is a graph 400 illustrating electromigration (EM) over time for a fixed single core 402 and a randomly rotated single core 404 according to one embodiment. Electromigration is the transport of material caused by the gradual movement of the ions in a conductor due to the momentum transfer between conducting electrons and diffusing metal atoms. Electromigration causes progressive damage to the metal conductors in an integrated circuit. The wear-out 402 of the fixed single core 402 reaches the Core Pfail target 406 after 5½ years if running on a single core, such as when a user manually disables all cores and runs the single core in turbo. Embodiments of the present disclosure equally distributes wear-out across all cores by randomly rotating the active single core, resulting in EM failure of the rotated single core 404 being orders of magnitude lower.

It should also be noted that operating systems, such as the Windows® operating system, assign cores in the same order. These operating systems have no provision for randomizing the core workload assignment. In a workstation environment, such as one with a small number of threads, the OS uses the lower core IDs, while the higher core IDs are mostly unused. In a server environment, applications are better threaded and can use the cores more uniformly. Even in this case, it is possible for a malicious attempt to keep assigning the same core and cause extreme wear-out on the same core(s). The embodiments described herein present several mechanisms to randomize core wear-out. In some embodiments, the wear-out equalizations are implemented in Pcode (e.g., firmware of PCU 104) and BIOS (e.g., 130). The embodiments described herein may balance the wear-out of multiple functional units (e.g., equivalent processor cores), such that they are exposed to similar stress over time. It should be noted that the wear-out equalizations may not be perfectly random, but can provide enough balancing to avoid legitimate and malicious uses of a sub-set of the functional units (e.g., processor resources).

The embodiments described herein use several techniques to equalize the wear-out of multiple instance processor cores, taking into account the time each core was in operation and the operating conditions (average voltage and temperature) during this use. Every processor that has multiple identical cores and independent voltage domains (power gates or independent VRs) can benefit from these wear-out equalizations. These techniques can be extended to other functional units including: 1) Graphics cores—similar implementation as processor cores; 2) I/O interfaces (e.g., serial links, DDR channels) and their controllers; 3) network and fabric controllers 4) VR phases. For example, a typical VRcan have eight phases, but only a subset of them is used at any given time in normal operation. The wear-out equalization unit 110 can monitor the stress accumulated in each VR phase and use that information to assign the least-stressed phases for new workloads. In some embodiments, the functional units 102 can be grouped in buckets that share the same voltage domain. In this case, the entire bucket is treated as one functional unit for the PCU's calculations detailed below. In general, each wear-out equalization solution has three steps: A) monitoring the wear-out incurred by each functional unit and store cumulative wear-out metrics; B) storage persistency of the metrics collected in step A) above; and C) taking actions to equalize the wear-out across multiple functional units based on the cumulative wear-out data. As will be discussed in more detail below, embodiments of the present disclosure can use several alternative algorithms to implement these three steps.

Figure 5:
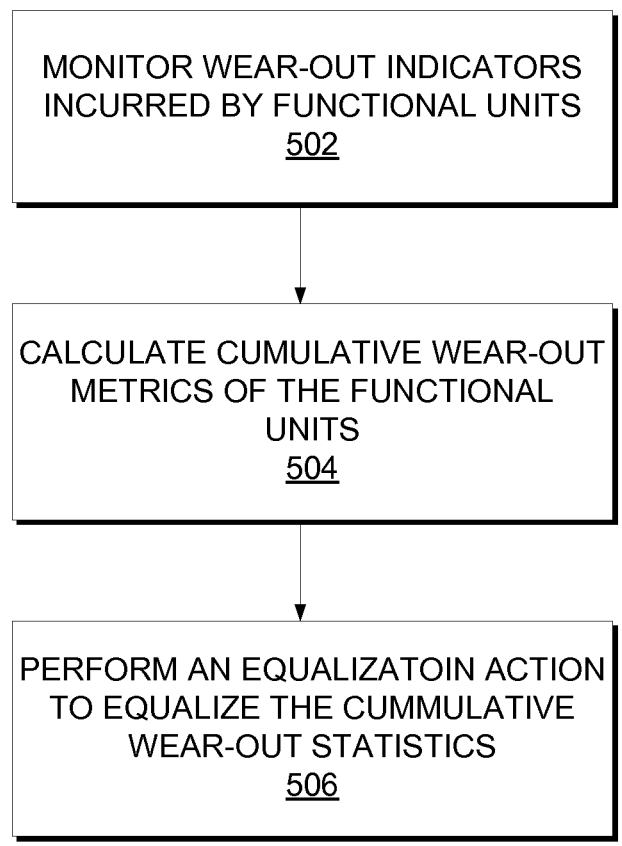
FIG. 5 is a flow diagram illustrating a method of equalizing wear-out of multiple functional units of a single integrated circuit die according to one embodiment.

FIG. 5 is a flow diagram illustrating a method 500 of equalizing wear-out of multiple functional units of a single integrated circuit die according to one embodiment. Method 500 may be performed by processing logic that may comprise hardware (e.g., circuitry, dedicated logic, programmable logic, microcode, etc.), software (such as instructions run on a processing device), firmware, or a combination thereof. In one embodiment, method 500 is performed by processing device 100, and more specifically PCU 104 of FIG. 1. In another embodiment, the method 500 is performed by wear-out equalization unit 110 as described herein.

Referring to FIG. 5, the method 500 begins by the processing logic monitoring indicators of wear-out incurred by the functional hardware units of an integrated circuit (block 502). The indicators may be temperature, voltage, frequency, power state, OS performance state requests, or the like, and the indicators may have an element of time associated. For example, the wear-out calculations can be determined periodically, such as on a fixed-time interval. Based on the monitored indicators, the processing logic calculates cumulative wear-out metrics of the functional units (block 504). The cumulative wear-out metrics may be a count, an average, a mean, or other metrics derived from the monitored indicators. The processing logic performs an equalization action to equalize the cumulative wear-out metrics (block 506).

In one embodiment of monitoring wear-out, the PCU's computing requirements can be simplified by performing the wear-out calculation on a fixed-time interval. In effect, any functional unit usage less than this fixed time period may be ignored. The fixed-time period can be chosen to be short enough to consider the temperature constant across this time window (since temperature is slow changing). This may reduce the computational load required to integrate the temperature changes over this period of time.

In some embodiments, the wear-out sustained by functional units can be calculated using registers 122 to maintain a cumulative wear-out counter for each functional unit. For each of the functional units, the processing logic can determine a frequency and a voltage of the respective functional unit and increment a counter, corresponding to the respective functional unit with a value that is proportional to the frequency and the voltage of the respective functional unit. Alternatively, the processing logic calculates the incremental wear-out for this time unit and then adds incremental wear-out to an accumulated wear-out counter for this functional unit.

In another embodiment, the power state (P-state also referred to as performance state) can be used as a proxy for the pair of voltage and frequency conditions. For example, the processing logic determines a power state of the respective functional unit as a proxy and increments a counter, corresponding the respective functional unit, with a value assigned to the power state. This may be done to minimize the computational complexity for the processing logic (e.g., PCU 104). For example, every 1 ms, an incremental wear out value, corresponding to the P-state in the following table, is added to the counter. If a functional unit is powered off (V=0), no wear-out value is added.

| P-state | Frequency | Wear-out |
|---------|-----------|----------|
| P0 | Max turbo | 1.4 |
| P1 | High-Frequency mode (HFM) | 1.0 |
| ... | ... | ... |
| Pn | Low-Frequency mode (LFM) | 0.2 |

In addition, various other numbers of P-states, frequency modes, and wear-out values can be used with embodiments of the present disclosure.

Alternatively, the voltage, temperature and operating time of multiple equivalent functional units can be used to calculate the wear-out of the multiple equivalent functional units. In one embodiment, the processing logic determines a voltage-temperature condition based on measured voltage and measured temperature and determines a period of time that the respective functional unit operates at the voltage-temperature condition. The processing logic calculates an equivalent-use time of the respective functional hardware unit based on the measured voltage, measured temperature and period of time, and sums the equivalent-use time over time. For example, considering a functional unit with a reference voltage, Vref, and reference junction temperature, Tref. During the period of time t, this functional unit operates at voltage V and temperature T. The processing logic calculates a temperature acceleration factor and a voltage acceleration factor and multiples them together and the period of time. For example, the processing logic (e.g., PCU 104) calculates the equivalent use time at (Vref, Tref) conditions as follows:

$$t * AF(V) * AF(T),$$

where AF(V) is a voltage-based acceleration factor and AF(T) is a temperature-based acceleration factor and can be expressed as follows:

$$AF(V) = e^{c*(V - Vref)}$$

$$AF(V) = e^{\left(\left(\frac{Ea}{Kb}\right)*\left(\frac{1}{T} - \frac{1}{Tref}\right)\right)}$$

where c is the voltage acceleration factor, Ea is the temperature acceleration factor, which are both are process-specific constants, and Kb is Boltzmann's constant. For each functional unit, the processing logic (e.g., PCU 104) adds up the time used at reference conditions and tries to equalize this stress across identical functional units in the integrated circuit die (e.g., processor cores against similar cores, VR phases across similar phases for each voltage domain). In this embodiment, this calculation is performed every time the (V, T) conditions change. If a functional unit is powered off (V=0), no wear-out is calculated. It should be noted that this method may be more computationally intensive than the method described above with counters, but may also more accurately reflect actual operating conditions of the functional units.

Figure 6:
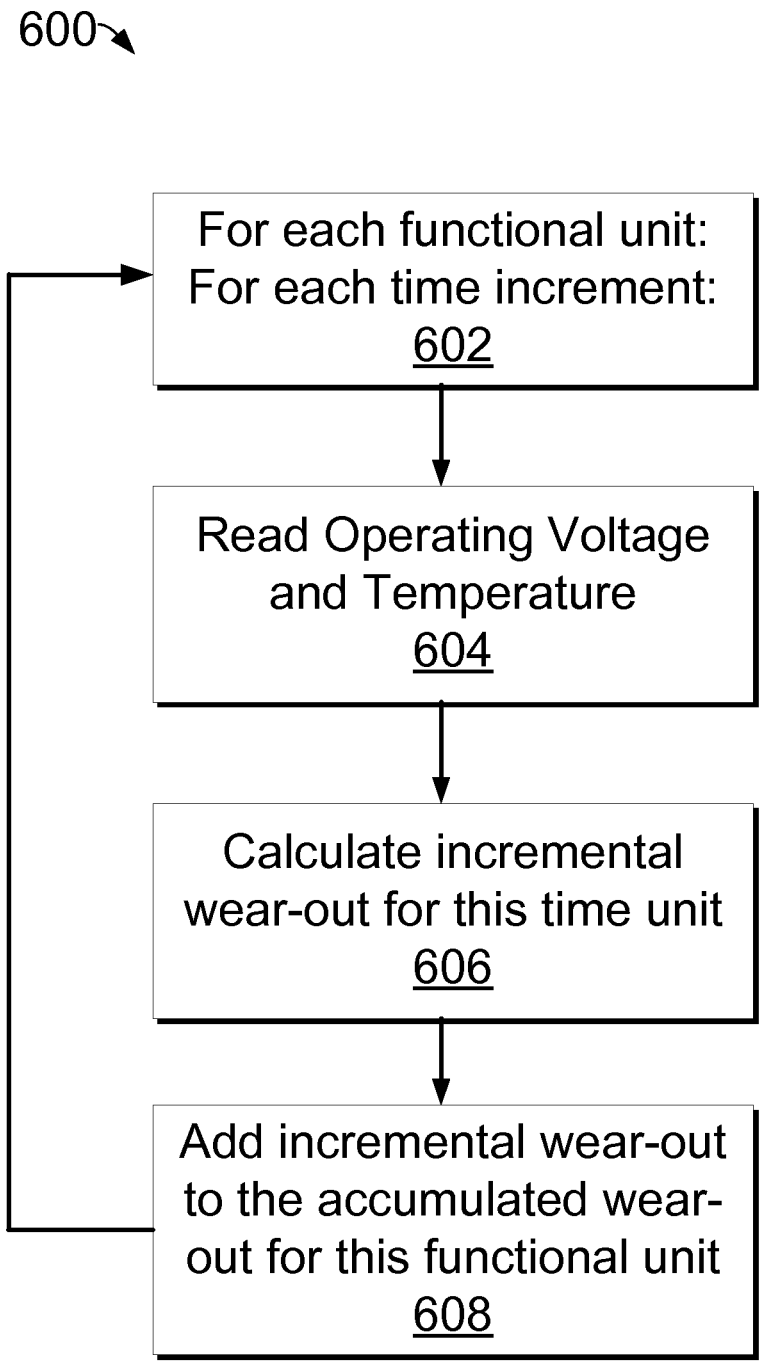
FIG. 6 is a flow diagram illustrating a method of calculating a cumulative wear-out metric per functional unit according to one embodiment.

FIG. 6 is a flow diagram illustrating a method 600 of calculating a cumulative wear-out metric per functional unit according to one embodiment. Method 600 may be performed by processing logic that may comprise hardware, software, firmware, or a combination thereof. In one embodiment, method 600 is performed by processing device 100, PCU 104, or wear-out equalization unit 110 as described herein.

Referring to FIG. 6, the method 600 begins by the processing logic selecting each functional unit for each time increment (block 602), and reading operating voltage and temperature, such as from registers or memory locations storing this information (block 604). The voltage and temperature may be measured by sensors at the functional units. The processing logic calculates an incremental wear-out for this time unit (block 606), and adds the incremental wear-out to the accumulated wear-out for this functional unit (block 608), and returns to block 602).

Regarding storage persistency, the processing logic (e.g., PCU 104) can store the wear-out metrics, such as the accumulated wear-out for the functional units in various, such as the three options set out in the table below. The wear-out metrics are stored on a per-unit basis.

| Non-volatile memory (NVM) availability in the platform | Wear-out data saved in NVM | Wear-out data persistence | Possible Benefit(s) |
| --- | --- | --- | --- |
| No NVM available in the platform, use volatile registers (e.g., 122) in the PCU 104 | NO | Lost at every system reset | Wear-out is equalized across functional units for each period of time between system resets |
| NVM 120 available in platform, but it is not physically associated with the processor package | YES | Lost when processor is removed from socket | Wear-out is equalized across identical functional units for the time the processor is in the same socket |
| NVM 120 available on the processor package (e.g., on-package serial EEPROM) | YES | Maintained with the processor package | Wear-out is equalized across identical functional units for the entire lifetime of the processor |

As set forth in the table above, the processing logic stores the cumulative wear-out metrics of the functional units in volatile registers (e.g., 122 of FIG. 1) of a PCU 104 in one embodiment. In another embodiment, the processing logic stores the cumulative wear-out metrics in a non-volatile memory device (e.g., 120 of FIG. 1). The non-volatile memory device may be integrated within the same integrated circuit package as the functional units and the PCU 104, where applicable. In another embodiment, the non-volatile memory device may be in the same platform, but outside of the integrated circuit die of the functional units.

Regarding actions to equalize wear-out, embodiments of the present disclosure can use several mechanisms to equalize the accumulated wear-out of the functional units.

Figure 7:
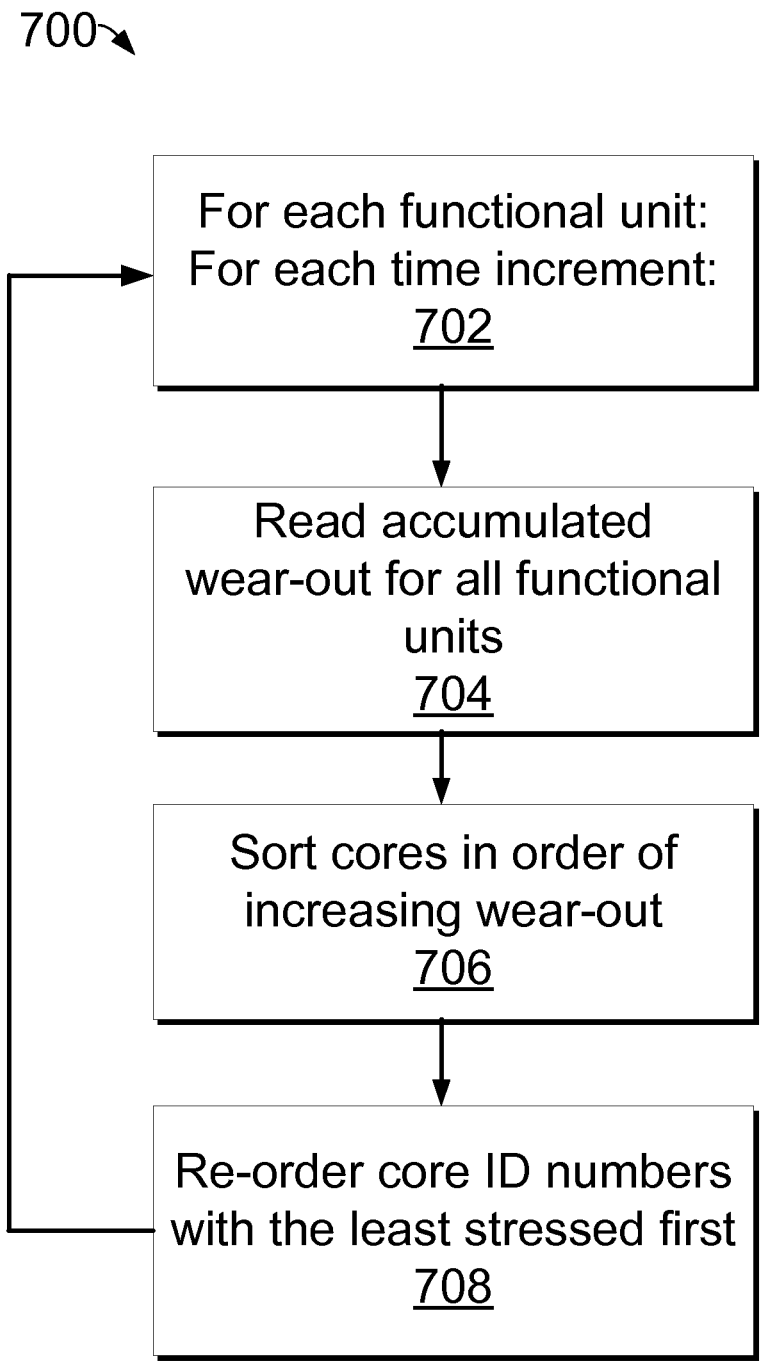
FIG. 7 is a flow diagram illustrating a method of performing an equalization action to equalize wear-out of multiple functional units according to one embodiment.

FIG. 7 is a flow diagram illustrating a method 700 of performing an equalization action to equalize wear-out of multiple functional units according to one embodiment. Method 700 may be performed by processing logic that may comprise hardware, software, firmware, or a combination thereof. In one embodiment, method 700 is performed by processing device 100, PCU 104, or wear-out equalization unit 110 as described herein.

Referring to FIG. 7, the method 700 begins by the processing logic selecting each functional unit for each time increment (block 702), and reading accumulated wear-out metrics for all functional units (block 704). The processing logic stores cores, such as by core ID in order of increasing wear-out (block 706) and reorders core ID numbers with the least stressed core first (block 708) and returns to block 702.

Figure 8:
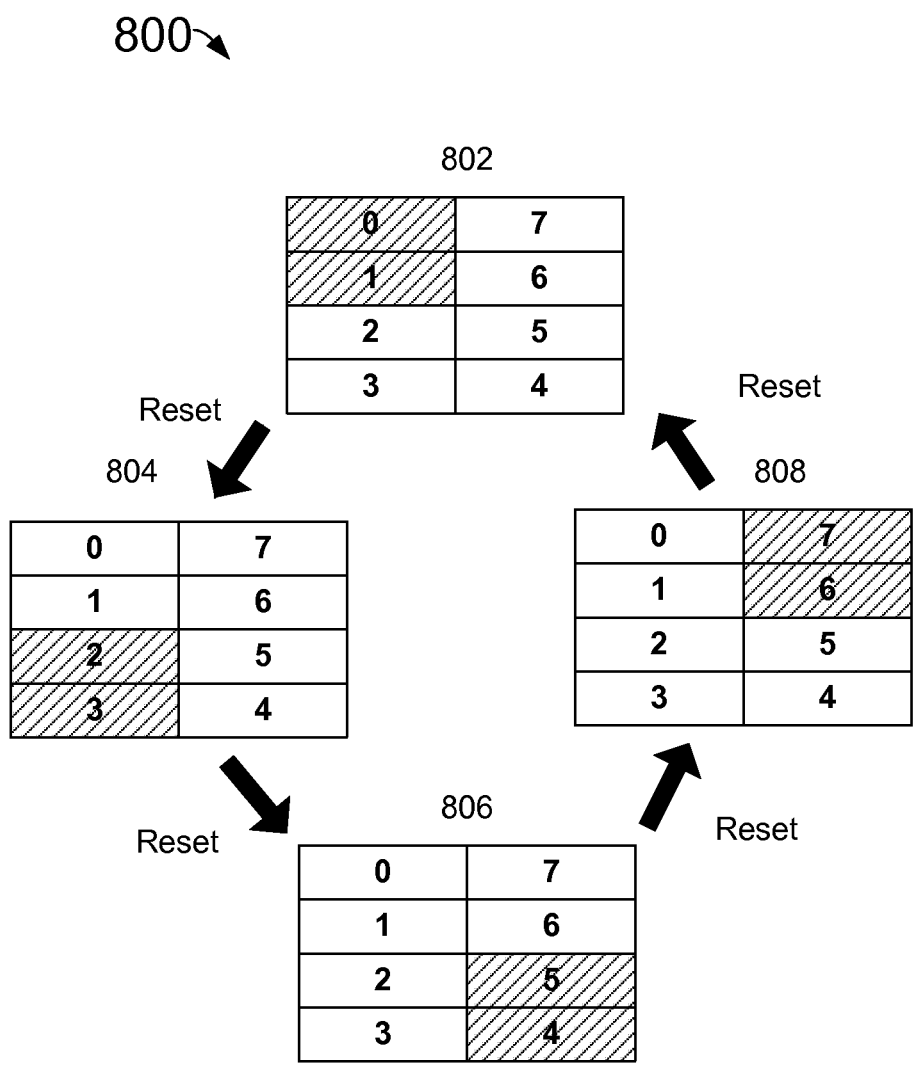
FIG. 8 illustrates a BIOS mechanism to rotate enabled cores at every reset according to one embodiment.

In another embodiment, the processing logic identifies a list of core identifiers of a subset of the functional units that are enabled in BIOS (e.g., 130 of FIG. 1) executing on the integrated circuit. At a reset of the integrated circuit, the processing logic reorders the list to include at least one core identifier that was disabled to randomize the wear-out incurred by the functional units. A simple eight-core processor example is shown in FIG. 8. Every time the system is reset (even if this happens as infrequently as once per year), the two active cores will change, so the wear-out is distributed.

FIG. 8 illustrates a BIOS mechanism 800 to rotate enabled cores at every reset according to one embodiment. In this embodiment, if a sub-set of the cores are enabled in BIOS (as denoted with hashed blocks), a simple mechanism is to re-order the core IDs that are enabled at every reset (system reboot) to randomize their wear-out. For example, at a first instance 802, the first two cores (0 and 1) are enabled, but after a reset at a second instance 804, the processing logic assigns the next two cores (2 and 3) to be enabled.

Similarly, after a second reset at a third instance 806, the next two cores (4 and 5) are enabled and after a third reset at a fourth instance 808, the next two cores (6 and 7) are enabled. Then, after a fourth reset, the first two cores (0 and 1) are enabled again, and so on and so forth. Of course, other patterns may be used to assign which of the cores may be enabled. Also, in this embodiment, there are eight cores and two cores are enabled, but in other embodiments, more or less cores could be used and more or less than two enabled cores may be applicable. This mechanism may be applicable for the case of a legitimate user that disables all but two cores and causes them to continuously run in turbo mode even if the randomization does not take into account the actual wear-out incurred by each core. The mechanism may also not guarantee an equal workload spread across all existing cores, but can provide randomization that equalizes wear-out of the set of cores.

Figure 9:
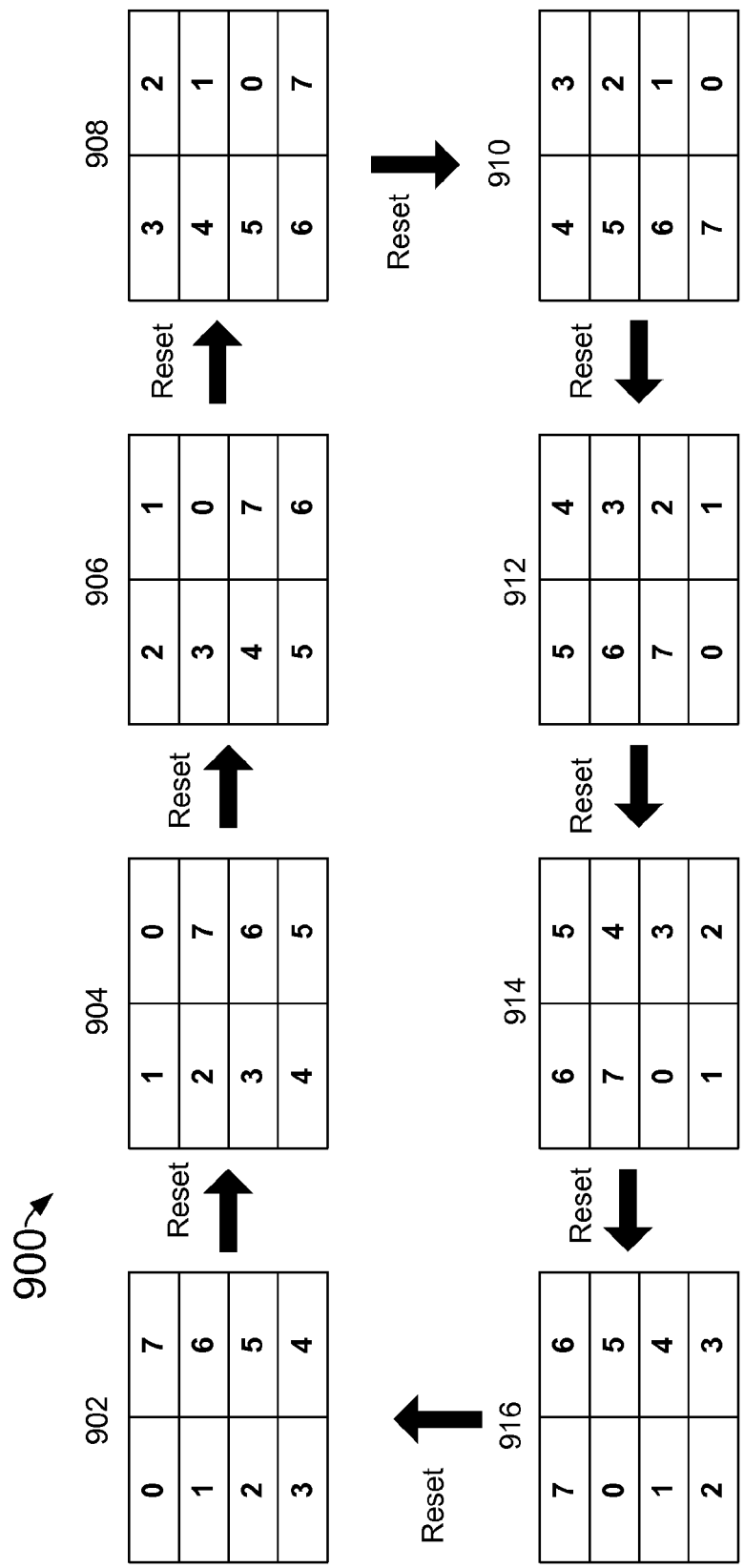
FIG. 9 illustrates a PCU mechanism to rotate assignment of logical core identifiers (IDs) to physical core IDs at every reboot according to another embodiment.

In another embodiment where all cores are enabled in BIOS, the processing logic can rotate the assignment of logical core IDS to the physical core IDs at every reset (reboot), as shown in an eight-core example in FIG. 9.

FIG. 9 illustrates a PCU mechanism 900 to rotate assignment of logical core IDs to physical core IDs at every reboot according to another embodiment. If all cores are enabled in BIOS, the PCU mechanism 900, such as pcode, can be used to rotate the assignment of the logical core IDs to the physical core IDs at every reboot. In this embodiment, a first assignment 902 maps the logical IDs 0-7 to the corresponding locations that correspond to the physical IDs. In the first assignment 902, the logical IDs match the physical IDs. At a first reset, the PCU mechanism 900 rotates to a second assignment 904, in which the logical IDs are shifted by one (1-7, 0). At a second reset, the PCU mechanism 900 rotates to a third assignment 906 in which the logical IDs are shifted by one (2-7, 0-1). Subsequent resets change to the respective assignments 908-916. At the next reset when at assignment 916, the assignment is changed back to the first assignment 902.

This PCU mechanism 900 may be used for a malicious user who writes a program that purposefully forces the operating system to continuously place the same logical core in turbo mode. Assignment rotations of the cores under OS procedures can be done only at reset. Then, if the malicious attempt continues for a prolonged period of time, a system reboot (as infrequent as once a year) may prevent a catastrophic processor failure by rotating the stress to another physical core once a year.

Alternatively, embodiments of the present disclosure use the PCU 104 to monitor the accumulated wear-out for each core using one of the mechanisms described above and calculate an average wear-out across all active cores. All cores that exceed this average by a programmable threshold are not allowed to be placed in turbo mode anymore until the wear-out of these cores fall back in line with the overall core average wear-out. Cores below the average may be allowed into turbo mode and accumulate more wear-out and will level out over time with the high wear-out cores.

In another embodiment, the PCU 104 calculates an average wear-out across the functional hardware units and determines that one or more of the functional units exceeds a threshold. The PCU 104 can perform the equalization action to equalize the cumulative wear-out metrics, such as, an action to prevent the one or more functional units from operating at a turbo state until the respective cumulative wear-out metrics does not exceed the threshold to randomize the wear-out incurred by the functional units.

Yet alternatively, embodiments of the present disclosure can periodically re-order the core IDs to randomize their wear-out in the existing OS and application environment. This may be done, for example, when all cores stop their work for a short quiet period while the thread assignments are migrated. The new core order places the cores with wear-out exceeding the average at the end of the queue, in order to minimize their job assignments and give them an opportunity to fall in line with the rest of the cores. Essentially, this is "core hopping" applied to wear-out equalization.

In another embodiment, the hardware units have core identifiers and the PCU 104 identifies a list of core identifiers of a subset of the functional units that are enabled in BIOS. At a reset, the PCU 104 re-orders the list to include at least one core identifier of one of the functional units that was disabled to randomize the wear-out incurred by functional units. In another embodiment, the functional units have physical core identifiers. The PCU 104 can equalize the cumulative wear-out metrics by rotating, at a reset, an assignment of logical core identifiers to the physical core identifiers to randomize the wear-out incurred by the functional units. In another embodiment, the PCU 104 periodically re-orders a list of the core identifiers in a software environment operating on the integrated circuit to randomize the wear-out incurred by the functional units.

Another embodiment of performing an equalization action includes providing an interface for the processor hardware to provide the OS with hints (or other indications) of how to assign jobs to available cores based on the monitored wear-out metrics. In addition to wear-out equalization, this may also be done to address within-die process variations, by differentiating between slower (lower leakage) and faster (higher leakage) cores. For example, using the interface, a customer that is focused on maximum performance may select the fastest core to run his critical job, while a power conscious customer may choose a lower leakage core. For wear-out leveling, this interface may be used to instruct the OS to avoid assigning intensive jobs to cores that have an accumulated wear-out higher than the average of all cores.

Figure 10:
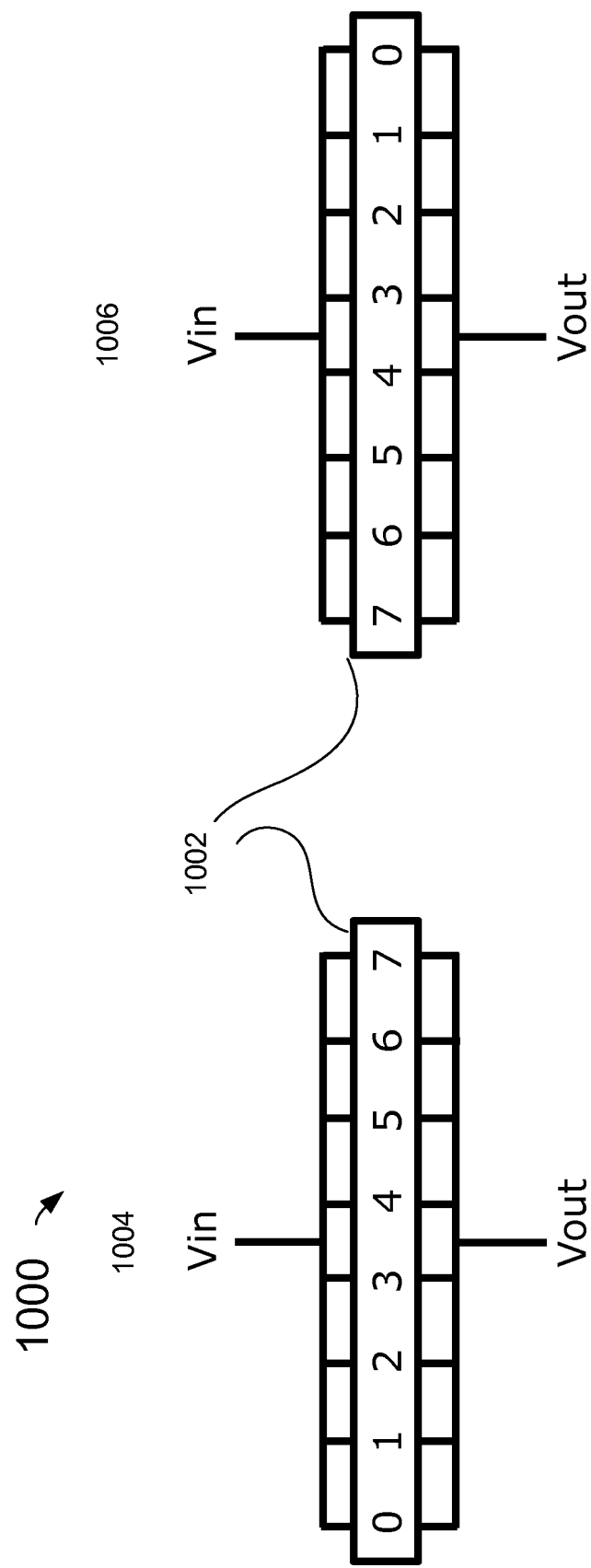
FIG. 10 illustrates a mechanism to rotate assignment of voltage regulator (VR) phases to equalize wear-out of the VR phases of a VR according to one embodiment.

FIG. 10 illustrates a mechanism to rotate assignment of VR phases to equalize wear-out of the VR phases of a VR 1002 according to one embodiment. In this embodiment, the wear-out equalization unit rotates assignments of the VR phases of the VR 1002. In particular, the VR 1002 has a first assignment 1004 where the VR phases are assigned from left to right. Upon a system reset, the wear-out equalization unit changes the assignment of the VR phases to a second assignment 1006 where the VR phases are assigned from right to left. Since at any given time only a sub-set of the phases are enabled, this mechanism ensures a good-enough randomization across all eight phases. Alternatively, other assignments can be made by the wear-out equalization unit. The VR phase assignment can be changed every time the VR is powered-down (since the load it serves is inactive for a period of time), including system reset.

Figure 11:
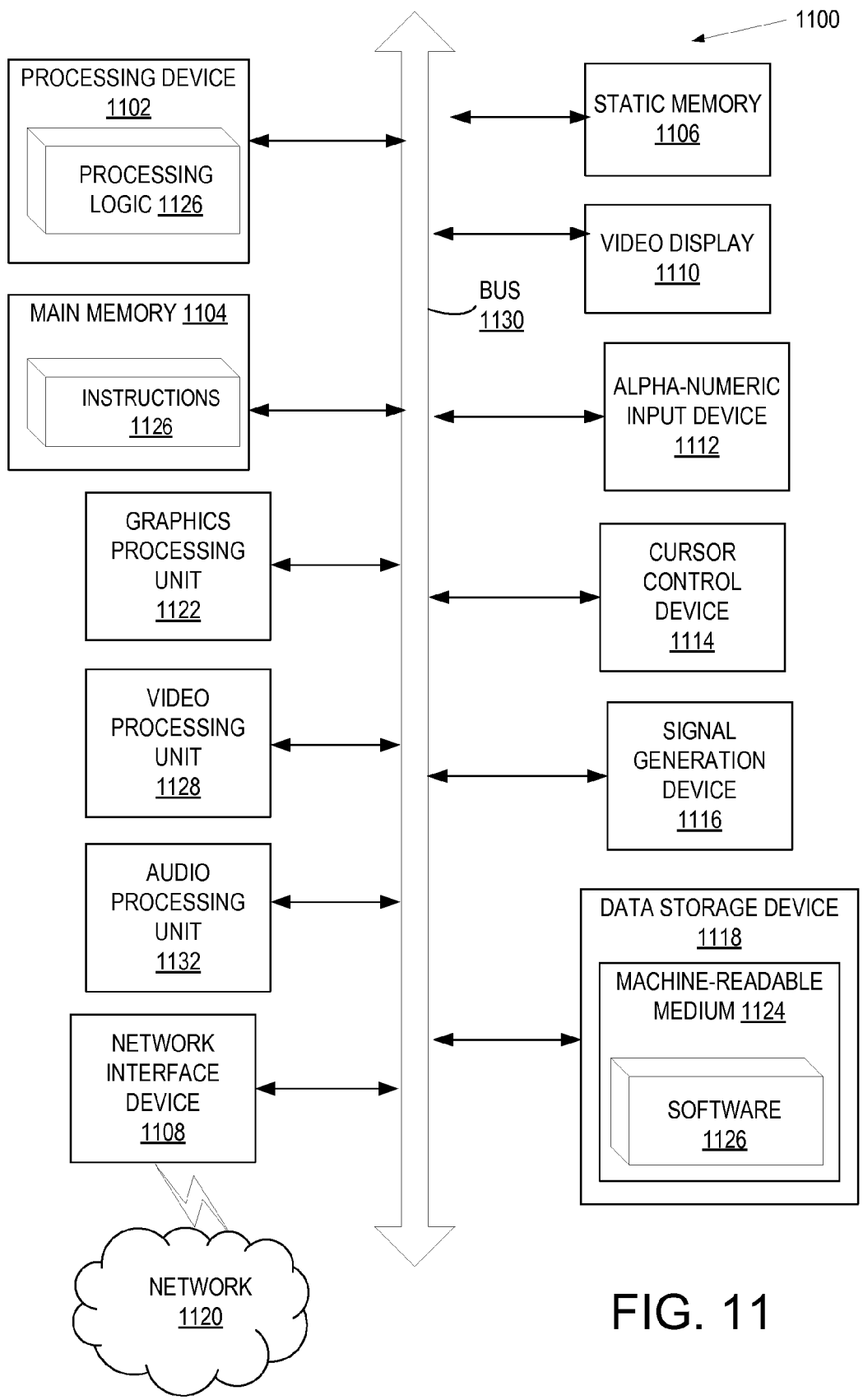
FIG. 11 illustrates a diagrammatic representation of a machine in the example form of a computer system within which a set of instructions, for causing the machine to perform any one or more of the methodologies discussed herein, may be executed.

FIG. 11 illustrates a diagrammatic representation of a machine in the example form of a computer system 1100 within which a set of instructions, for causing the machine to perform any one or more of the methodologies discussed herein, may be executed. In alternative embodiments, the machine may be connected (e.g., networked) to other machines in a LAN, an intranet, an extranet, or the Internet.

The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1100 includes a processing device 1102, a main memory 1104 (e.g., read-only memory (ROM), flash memory, dynamic random access memory (DRAM) (such as synchronous DRAM (SDRAM) or DRAM (RDRAM), etc.), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. In one embodiment, processing device 1102 may include one or processing cores. The processing device 1102 is configured to execute the processing logic 1126 for performing the operations and steps discussed herein. In one embodiment, processing device 1102 is the same as processing device 100 described with respect to FIG. 1 that implements wear-out equalization. For example, processing device 1102 may include a wear-out equalization unit 110 of FIG. 1, a PCU 104 of FIG. 1, or any combination thereof.

The computer system 1100 may further include a network interface device 1108 communicably coupled to a network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), a signal generation device 1116 (e.g., a speaker), or other peripheral devices. Furthermore, computer system 1100 may include a graphics processing unit 1122, a video processing unit 1128, and an audio processing unit 1132. In another embodiment, the computer system 1100 may include a chipset (not illustrated), which refers to a group of integrated circuits, or chips, that are designed to work with the processing device 1102 and controls communications between the processing device 1102 and external devices. For example, the chipset may be a set of chips on a motherboard that links the processing device 1102 to very high-speed devices, such as main memory 1104 and graphic controllers, as well as linking the processing device 1102 to lower-speed peripheral buses of peripherals, such as USB, PCI or ISA buses.

The data storage device 1118 may include a machine-accessible storage medium 1124 on which is stored software 1126 embodying any one or more of the methodologies of functions described herein. The software 1126 may also reside, completely or at least partially, within the main memory 1104 as instructions 1126 and/or within the processing device 1102 as processing logic 1126 during execution thereof by the computer system 1100; the main memory 1104 and the processing device 1102 also constituting machine-accessible storage media.

The machine-readable storage medium 1124 may also be used to store instructions 1126 of the wear-out equalization unit 110, such as described with respect to processing device 100 in FIG. 1, and/or a software library containing methods that call the above applications. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present embodiments. The term "machine-accessible storage medium" shall accordingly be taken to include, but not be limited to, solid-state memories, and optical and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An integrated circuit comprising:
    a power control unit (PCU); and
    a plurality of functional hardware units coupled to the power control unit, wherein the PCU is configured to:
        monitor indicators of wear-out incurred by the plurality of functional hardware units;
        calculate cumulative wear-out metrics of the plurality of functional hardware units based on the monitored indicators; and
    perform an equalization action to equalize the cumulative wear-out metrics of the plurality of functional hardware units, wherein to perform the equalization action the PCU is configured to:
        identify a list of core identifiers of a subset of the plurality of functional hardware units that are enabled in basic input-output system (BIOS) executing on the integrated circuit; and
        at a reset of the integrated circuit, re-order the list to include at least one core identifier of one of the plurality of functional hardware units that was disabled to randomize the wear-out incurred by the plurality of functional hardware units.

2. The integrated circuit of claim 1, further comprising a memory device coupled to the PCU, wherein the PCU is configured to store the cumulative wear-out metrics.

3. The integrated circuit of claim 1, wherein the plurality of functional hardware units are disparate functional hardware units.

4. The integrated circuit of claim 1, wherein the plurality of functional hardware units comprise processor cores.

5. The integrated circuit of claim 1, wherein the plurality of functional hardware units comprises at least one a processor core, a graphics unit, an input-output (I/O) interface, a network controller, or a fabric controller.

6. The integrated circuit of claim 1, wherein the plurality of functional hardware units are voltage regulator (VR) phases of a VR.

7. A method comprising:
    monitoring, by a power control unit (PCU), indicators of wear-out incurred by a plurality of functional hardware units of an integrated circuit;
    calculating, by the PCU, cumulative wear-out metrics of the plurality of functional hardware units based on the monitored indicators; and
    performing an equalization action to equalize the cumulative wear-out metrics of the plurality of functional hardware units, wherein performing the equalization action comprises:

identifying a list of core identifiers of a subset of the plurality of functional hardware units that are enabled in basic input-output system (BIOS) executing on the integrated circuit; and at a reset of the integrated circuit, re-ordering the list to include at least one core identifier of one of the plurality of functional hardware units that was disabled to randomize the wear-out incurred by the plurality of functional hardware units.

8. The method of claim 7, further comprising periodically computing wear-out calculations of the wear-out incurred by the plurality of functional hardware units on a fixed-time interval.

9. The method of claim 8, wherein the periodically computing the wear-out calculations comprises:
for each of the plurality of functional hardware units,
determining a frequency and a voltage of the respective one of the plurality of functional hardware units; and
incrementing a counter, corresponding to the respective functional hardware unit, with a value that is proportional to the frequency and the voltage.

10. The method of claim 8, wherein the periodically computing the wear-out calculations comprises:
for each of the plurality of functional hardware units,
determining a power state of the respective one of the plurality of functional hardware units, wherein the power state is a proxy for a frequency and a voltage of the respective functional hardware unit; and
incrementing a counter, corresponding to the respective functional hardware unit, with a value assigned to the power state.

11. The method of claim 7, further comprising:
for each of the plurality of functional hardware units,
determining a voltage-temperature condition based on measured voltage and measured temperature of the respective one of the plurality of functional hardware units;
determining a period of time that the respective one of the plurality of functional hardware units operates at the voltage-temperature condition;
calculating an equivalent-use time of the respective one of the plurality of functional hardware units based on the measured voltage, measured temperature and period of time; and
summing the equivalent-use time over time.

12. The method of claim 11, wherein the calculating the equivalent-use time is performed when the voltage-temperature condition changes.

13. The method of claim 11, wherein the calculating the equivalent-use time comprises:
calculating a temperature acceleration factor;
calculating a voltage acceleration factor; and
multiplying the temperature acceleration factor by the voltage acceleration factor and the period of time.

14. The method of claim 7, further comprising storing the cumulative wear-out metrics of the plurality of functional hardware units in volatile registers of a power control unit (PCU).

15. The method of claim 7, further comprising storing the cumulative wear-out metrics of the plurality of functional hardware units in a non-volatile memory device.

16. The method of claim 15, wherein the non-volatile memory device is integrated within the integrated circuit.

17. The method of claim 7, wherein the performing the equalization action to equalize the cumulative wear-out metrics comprises providing an interface to an operating system (OS) with one or more hints of how to assign jobs to the plurality of functional hardware units.

18. A non-transitory, computer-readable storage medium including instructions that, when executed by a processing device, cause the processing device to perform a method comprising:
monitoring indicators of wear-out incurred by a plurality of functional hardware units of an integrated circuit;
calculating cumulative wear-out metrics of the plurality of functional hardware units based on the monitored indicators; and
performing an equalization action to equalize the cumulative wear-out metrics of the plurality of functional hardware units, wherein the performing the equalization action comprises:
for each of the plurality of functional hardware units and for each time increment:
reading the accumulated wear-out metrics for the plurality of functional hardware units, and
sorting the plurality of functional hardware units in order of increasing wear-out based on the accumulated wear-out calculations, and re-order core identifier numbers with the least accumulated wear-out calculation.

19. The storage medium of claim 18, wherein the calculating the cumulative wear-out metrics comprises:
for each of the plurality of functional hardware units and for each time increment:
reading operating voltage and temperature of the respective functional hardware unit,
computing an incremental wear-out calculation for the time increment, and
adding the incremental wear-out calculation to an accumulated wear-out calculation for the respective functional unit.

20. A system comprising:
a single integrated circuit die comprising a plurality of functional hardware units, wherein the plurality of functional hardware units comprise physical core identifiers and at least two processor cores and at least one graphics core;
a peripheral device;
a chipset coupled to the peripheral device and the single integrated circuit die, wherein the single integrated circuit die comprises a power control unit (PCU) configured to:
calculate incremental wear-out calculations for the at least two processor cores and the at least one graphics cores;
add each of the incremental wear-out calculations to a respective accumulated wear-out calculation for each of the at least two processor cores and the at least one graphics cores; and
perform an equalization algorithm to equalize wear-out of the at least two processor cores and the at least one graphics cores based on the respective accumulated wear-out calculation for each of the at least two processor cores and the at least one graphics core, wherein to perform the equalization algorithm the PCU is configured to:
at a reset of the integrated circuit, rotate an assignment of logical core identifiers to the physical core identifiers to randomize the wear-out incurred by the plurality of functional hardware units.

21. The system of claim 20, further comprising a non-volatile memory device coupled to the single integrated circuit die, wherein the PCU is further configured to store the accumulated wear-out calculations in the non-volatile memory.

22. The system of claim 20, wherein the PCU is further configured to
periodically rotate the assignment of the logical core identifiers to the physical core identifiers in a software environment operating on the integrated circuit to randomize the wear-out incurred by the plurality of functional hardware units.

23. A method comprising:
monitoring, by a power control unit (PCU), indicators of wear-out incurred by a plurality of functional hardware units of an integrated circuit;
calculating, by the PCU, cumulative wear-out metrics of the plurality of functional hardware units based on the monitored indicators; and
performing an equalization action to equalize the cumulative wear-out metrics of the plurality of functional hardware units, wherein performing the equalization action comprises:
calculating an average wear-out across the plurality of functional hardware units; and
determining that one or more of the plurality of functional hardware units exceeds a threshold, and wherein the performing the equalization action to equalize the cumulative wear-out metrics comprises preventing the one or more of the plurality of functional hardware units from operating at a turbo state until the respective cumulative wear-out metrics does not exceed the threshold to randomize the wear-out incurred by the plurality of functional hardware units.

24. The method of claim 23, further comprising periodically computing wear-out calculations of the wear-out incurred by the plurality of functional hardware units on a fixed-time interval.

25. The method of claim 23, wherein the periodically computing the wear-out calculations comprises:
for each of the plurality of functional hardware units,
determining a frequency and a voltage of the respective one of the plurality of functional hardware units; and
incrementing a counter, corresponding to the respective functional hardware unit, with a value that is proportional to the frequency and the voltage.

26. The method of claim 23, wherein the periodically computing the wear-out calculations comprises:
for each of the plurality of functional hardware units,
determining a power state of the respective one of the plurality of functional hardware units, wherein the power state is a proxy for a frequency and a voltage of the respective functional hardware unit; and
incrementing a counter, corresponding to the respective functional hardware unit, with a value assigned to the power state.

* * * * *